US012761524B2

(12) United States Patent
Chen et al.

(10) Patent No.: US 12,761,524 B2
(45) Date of Patent: Oct. 13, 2026

(54) OPTICAL ELEMENT DRIVING MECHANISM

(71) Applicant: Acutek Corporation, Taoyuan City (TW)

(72) Inventors: Yung-Yun Chen, Taoyuan City (TW); Jui-Che Meng, Taoyuan City (TW); Tso-Hsiang Wu, Taoyuan City (TW); Ko-Lun Chao, Taoyuan City (TW)

(73) Assignee: ACTUTEK CORPORATION, Taoyuan City (TW)

( * ) Notice: Subject to any disclaimer, the term of this patent is extended or adjusted under 35 U.S.C. 154(b) by 358 days.

(21) Appl. No.: 18/414,052

(22) Filed: Jan. 16, 2024

(65) Prior Publication Data

US 2024/0241426 A1 Jul. 18, 2024

Related U.S. Application Data

(60) Provisional application No. 63/439,409, filed on Jan. 17, 2023.

(51) Int. Cl.
*G03B 5/00* (2021.01)
*G02B 7/02* (2021.01)

(52) U.S. Cl.
CPC ................. *G03B 5/00* (2013.01); *G02B 7/02* (2013.01); *G03B 2205/0069* (2013.01)

(58) Field of Classification Search
CPC ..... G03B 5/00; G03B 2205/0069; G02B 7/02
See application file for complete search history.

(56) References Cited

U.S. PATENT DOCUMENTS

| | | | | |
|---|---|---|---|---|
| 2019/0204532 | A1* | 7/2019 | Konuma | G02B 27/646 |
| 2021/0149143 | A1* | 5/2021 | Hu | G02B 7/08 |
| 2022/0121025 | A1* | 4/2022 | Wang | G02B 7/04 |
| 2022/0308421 | A1* | 9/2022 | Hung | G02B 7/04 |
| 2024/0241337 | A1* | 7/2024 | Chen | G03B 3/10 |
| 2024/0393664 | A1* | 11/2024 | Osaka | H04N 23/50 |

FOREIGN PATENT DOCUMENTS

| | | | | |
|---|---|---|---|---|
| CN | 114185145 A | 3/2022 | | |
| WO | WO-2023026964 A1 * | 3/2023 | | G03B 5/00 |

OTHER PUBLICATIONS

The Office Action issued on Aug. 14, 2024 for the corresponding Application No. 202420117827.X in China.

* cited by examiner

*Primary Examiner* — Christopher E Mahoney
(74) *Attorney, Agent, or Firm* — MUNCY, GEISSLER, OLDS & LOWE, P.C.

(57) ABSTRACT

An optical element driving mechanism is provided, and includes a movable portion, a fixed portion, and a driving assembly. The movable portion is used to connect an optical element and is movable relative to the fixed portion. The driving assembly is used to drive the movable portion to move relative to the fixed portion in a first axis.

18 Claims, 18 Drawing Sheets

OPTICAL ELEMENT DRIVING MECHANISM

CROSS REFERENCE TO RELATED APPLICATIONS

This application claims the benefit of U.S. Provisional Application No. 63/439,409, filed Jan. 17, 2023, the entirety of which is incorporated by reference herein.

BACKGROUND OF THE INVENTION

Field of the Invention

The present disclosure relates to an optical element driving mechanism, and in particular to an optical element driving mechanism including a guiding assembly for moving the movable portion relative to the fixed portion.

Description of the Related Art

With the development of technology, the application of electronic devices has become more and more popular. In particular, electronic devices with camera or video functions, such as mobile phones and laptops, have gradually become an indispensable part of daily life. Currently, these electronic devices are usually equipped with multi-lens modules to achieve higher quality photography functions. However, in terms of manufacturing cost and functionality, there is still room for improvement in existing multi-lens modules.

BRIEF SUMMARY OF THE INVENTION

An embodiment of the present invention provides an optical element driving mechanism, which includes a movable portion, a fixed portion, and a driving assembly. The movable portion is used to connect an optical element and is movable relative to the fixed portion. The driving assembly is used to drive the movable portion to move relative to the fixed portion in a first axis.

In some embodiments, the optical element driving mechanism further includes a guiding assembly, wherein the movable portion is movable along the first axis relative to the fixed portion via the guiding assembly, and the guiding assembly includes a first guiding assembly and a second guiding assembly. The second guiding assembly is in contact with and movable relative to the first guiding assembly. The first contact surface of the first guiding assembly contacts the second contact surface of the second guiding assembly. In the second axis, the maximum dimension of the first contact surface is different from the maximum dimension of the second contact surface, and the second axis is perpendicular to the first axis.

In some embodiments, in the second axis, the maximum size of the first contact surface is greater than the maximum size of the second contact surface. In some embodiments, the second guiding assembly further includes a first positioning portion having a first positioning surface. The first positioning surface faces the first guiding assembly, and an angle formed between the first positioning surface and the second contact surface is between 15 degrees and 60 degrees. In some embodiments, when the movable portion is located at the first position, the first guiding assembly abuts the first positioning portion, and the optical element blocks a plurality of optical openings of the fixed portion.

In some embodiments, the second guiding assembly further includes a second positioning portion having a second positioning surface. The second positioning surface faces the first guiding assembly, the second positioning surface is not parallel and not perpendicular to the first positioning surface. In some embodiments, the second positioning surface is not parallel and not perpendicular to the second contact surface. In some embodiments, the angle between the first positioning surface and the second contact surface is different from an angle between the second positioning surface and the second contact surface, and the angle between the first positioning surface and the second contact surface is greater than the angle between the second positioning surface and the second contact surface.

In some embodiments, the optical element driving mechanism further includes a linkage assembly, wherein when the movable portion moves relative to the fixed portion, the optical element is driven to move via the linkage assembly, and the optical element is movable relative to the movable portion. In some embodiments, the linkage assembly includes a linkage element and an opening structure. The linkage element has a protruding structure. The opening structure corresponds to the linkage element. In some embodiments, the linkage element and the opening structure overlap in the second axis and the third axis that are each perpendicular to the first axis and are perpendicular to each other.

In some embodiments, the first corresponding surface of the movable portion faces a second corresponding surface of the optical element, and when the movable portion is located at an intermediate position, the first corresponding surface does not contact the second corresponding surface. In some embodiments, when the movable portion is located at the intermediate position, the first corresponding surface is not parallel to the second corresponding surface.

In some embodiments, the optical element driving mechanism further includes a magnetically permeable sheet embedded in the fixed portion. When the movable portion is located at the extreme position, the magnetically permeable sheet is spaced apart from the movable portion. In some embodiments, when the movable portion is located at the extreme position, the bearing portion of the movable portion contacts the fixed portion. In some embodiments, the bearing portion comprises a chamfer structure, and when the movable portion is located at the extreme position, the chamfer structure contacts the fixed portion.

In some embodiments, the optical element driving mechanism further includes a circuit assembly electrically connected to the driving assembly. The circuit assembly includes a first contact and a second contact, and the first contact and the second contact are respectively located on opposite sides of a coil of the driving assembly. In some embodiments, the circuit assembly includes a plurality of segments embedded in the fixed portion, and the segments extend in different directions.

In some embodiments, the fixed portion comprises an outer frame, the outer frame has a top surface and a sidewall extending from the top surface, and the sidewall is not parallel to the top surface. In some embodiments, the angle between the sidewall and the top surface is less than 90 degrees.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The optical element driving mechanisms of some embodiments of the present disclosure are described in the following description. However, it should be appreciated that the following detailed description of some embodiments of the disclosure provides various concepts of the present disclosure which may be performed in specific backgrounds that may vary widely. The specific embodiments disclosed are provided merely to clearly describe the usage of the present disclosure by some specific methods without limiting the scope of the present disclosure.

In addition, relative terms such as "lower" or "bottom," "upper" or "top" may be used in the following embodiments in order to describe the relationship between one element and another element in the figures. It should be appreciated that if the device shown in the figures is flipped upside-down, the element located on the "lower" side may become the element located on the "upper" side. It should be noted that the first axis A1, the second axis A2 and the third axis A3 that are perpendicular to each other are defined in the present disclosure. These axial directions are for convenience of illustration only and are not intended to limit actual directions.

It should be understood that although the terms "first," "second," etc. may be used herein to describe various elements, materials and/or portions, these elements, materials and/or portions are not limited by the above terms. These terms merely serve to distinguish different elements, materials and/or portions. Therefore, a first element, material and/or portion may be referred to as a second element, material and/or portion without departing from the teaching of some embodiments in the present disclosure. Unless defined otherwise, the first or second element, material and/or portion in the claims may be interpreted as any element, material and/or portion in the specification as long as it conforms to the description in the claims.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure. In addition, the terms "substantially," "approximately" or "about" may also be recited in the present disclosure, and these terms are intended to encompass situations or ranges that is substantially or exactly the same as the description herein. It should be noted that unless defined specifically, even if the above terms are not recited in the description, it should be read as the same meaning as those approximate terms are recited.

Figure 1:
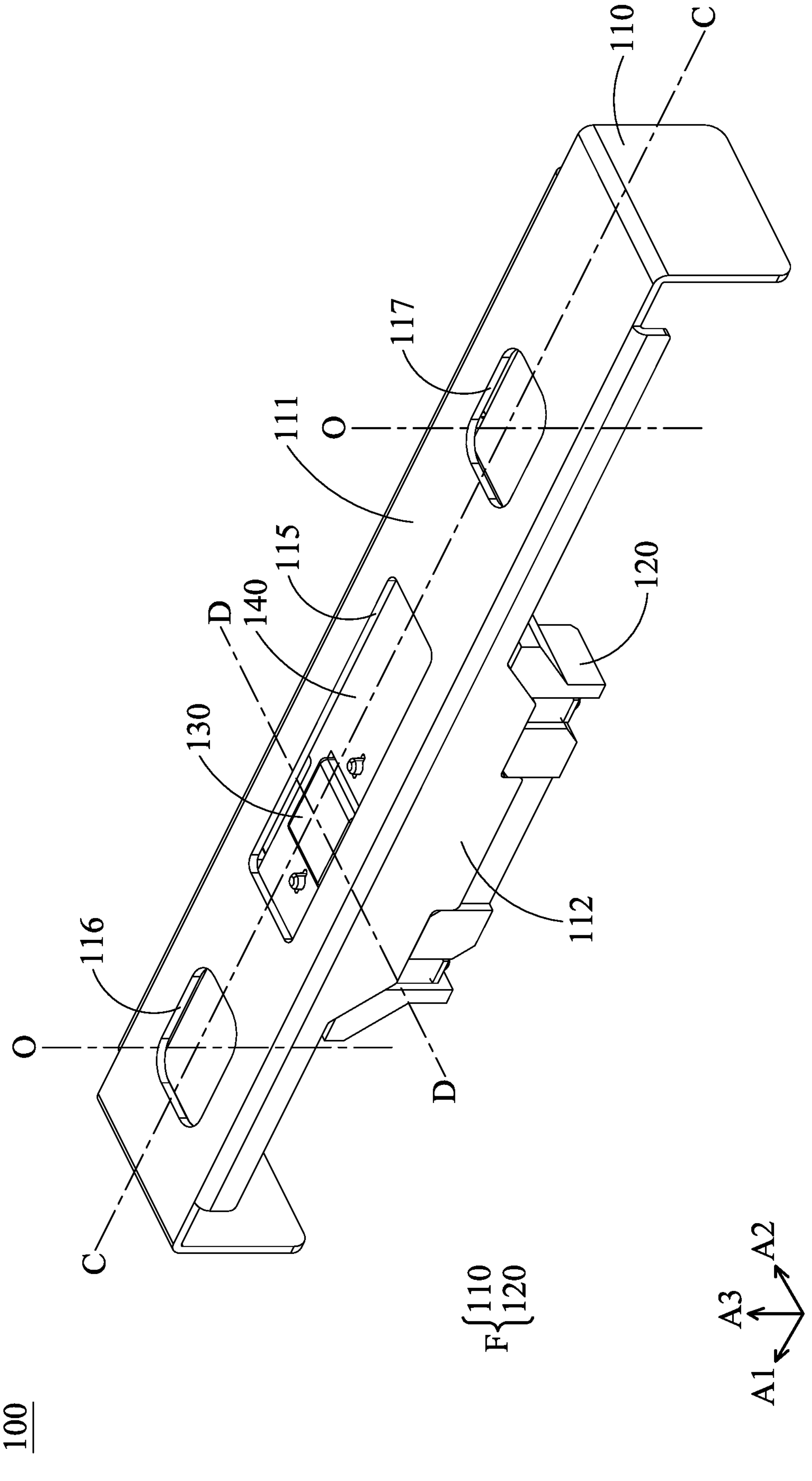
FIG. 1 shows a perspective view illustrating the optical element driving mechanism in accordance with some embodiment of the present disclosure.

FIG. 1 shows a perspective view illustrating the optical element driving mechanism 100 in accordance with some embodiment of the present disclosure. It should be noted that the optical element driving mechanism 100 can be disposed in any suitable electronic device, such as mobile phones, laptops, etc., but the present disclosure is not limited thereto. In some embodiments, the present disclosure merely illustrates a part of the optical element driving mechanism 100, and any optical element driving mechanism that may include this part is included within the scope of the present disclosure. As shown in FIG. 1, the optical element driving mechanism 100 includes a fixed portion F, a movable portion 130 and a driving assembly 160 (referring to FIG. 2). In some embodiments, the fixed portion F may include an outer frame 110 and a base 120. The movable portion 130 is used to connect an optical element 140, and the movable portion 130 is movable relative to the fixed portion F.

In some embodiments, the outer frame 110 may include a top surface 111 and sidewalls 112 extending from the top surface 111. For example, the normal direction of the top surface 111 may be substantially parallel to the third axis A3, and the sidewalls 112 may extend toward the base 120 and along the third axis A3. In some embodiments, the top surface 111 has a positioning opening 115 that corresponds to the range of motion of the movable portion 130. In other words, the range of motion of the movable portion 130 would not exceed the positioning opening 115. In some embodiments, the top surface 111 has a first optical opening 116 and a second optical opening 117, respectively corresponding to different optical modules (not shown). The driving assembly 160 may be used to drive the movable portion 130 (and the optical element 140 which is connected to the movable portion 130) to move relative to the fixed portion F along the first axis A1. By driving the movable portion 130 and the optical element 140 to move relative to the fixed portion F along the first axis A1 via the driving assembly 160, the optical element 140 may move to the light-shielding position and completely overlap the first optical opening 116 and the second optical opening 117 (as shown in FIG. 1). In this way, the optical element 140 may block the light and prevent the light from entering the optical modules (not shown) along the optical axis O (for example, parallel to the third axis A3). In addition, the optical element 140 may also move to the light-transmitting position to expose the first optical opening 116 and the second optical opening 117 (that is, the optical element 140 does not overlap with the first optical opening 116 and the second optical opening 117), so that light may pass through the first optical opening 116 and the second optical opening 117 along the optical axis O and enter the above optical modules.

Figure 2:
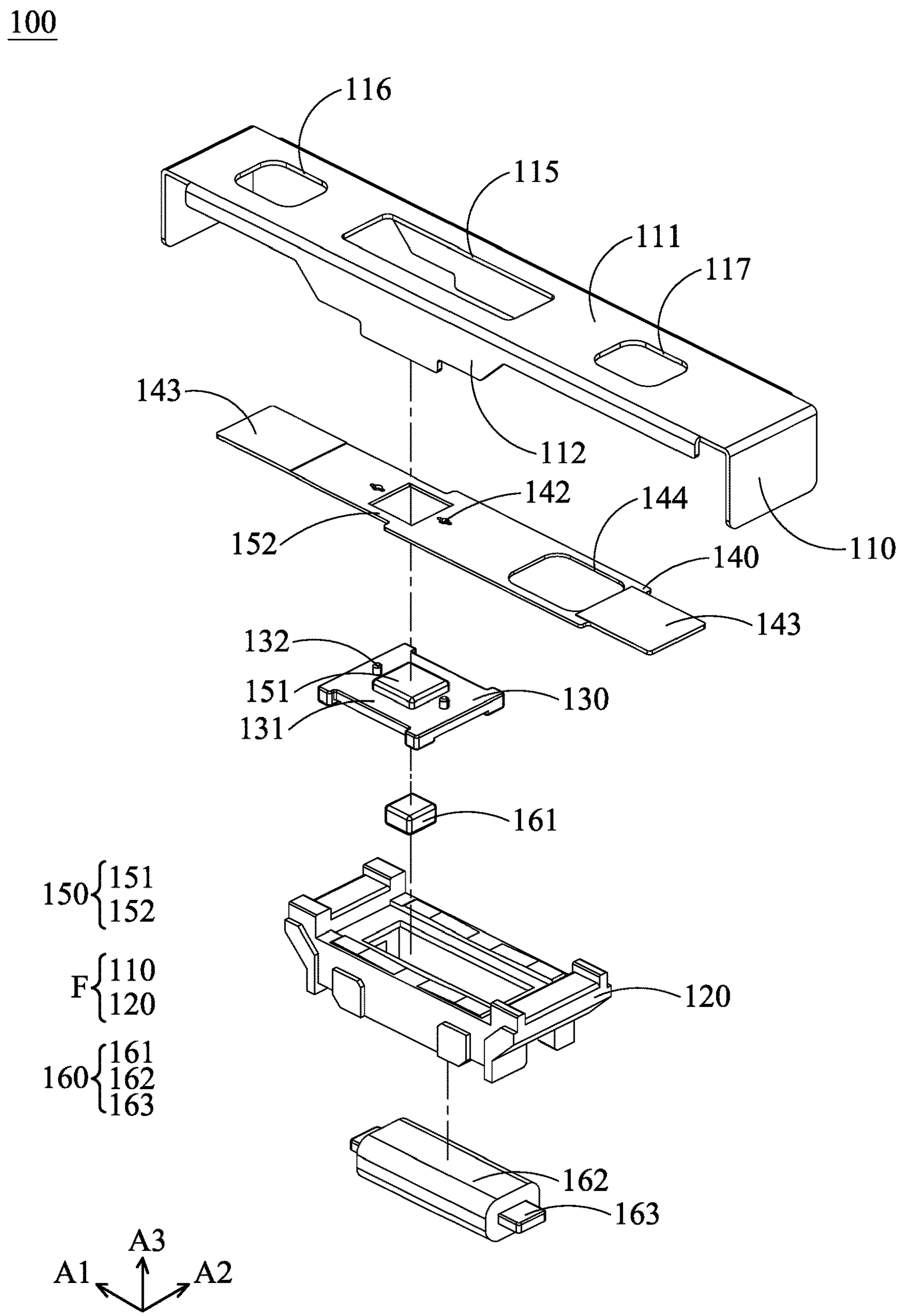
FIG. 2 shows an exploded view illustrating the optical element driving mechanism in accordance with some embodiment of the present disclosure.

FIG. 2 shows an exploded view illustrating the optical element driving mechanism 100 in accordance with some embodiments of the present disclosure. As shown in FIG. 2, the movable portion 130 and the optical element 140 are disposed in the space between the outer frame 110 and the base 120. Specifically, the movable portion 130 is disposed on the base 120, and the optical element 140 is connected to the movable portion 130 and located between the outer frame 110 and the movable portion 130. In some embodiments, the optical element 140 includes light-shielding portions 143 and a light-transmitting portion 144. For example, the light shielding portions 143 may correspond to the first optical opening 116 and the second optical opening 117. Specifically, the optical element 140 can be moved to a first position (for example, the light-shielding position), so that the light-shielding portions 143 block the first optical opening 116 and the second optical opening 117. In some embodiments, on a horizontal plane (the normal direction of which is parallel to the third axis A3, for example), the size of the light-shielding portions 143 may be larger than the size of the first optical opening 116 and/or the second optical opening 117. In some embodiments, the shape of the light-shielding portions 143 may be different from the shape of the first optical opening 116 and/or the second optical opening 117. However, the present disclosure is not limited thereto. It should be understood that any light-shielding portions 143 that can block the first optical opening 116 and the second optical opening 117 is included within the scope of the present disclosure.

In addition, the light-transmitting portion 144 may be an opening structure corresponding to the first optical opening 116 and the second optical opening 117. In some embodiments, the light-transmitting portion 144 may be located between the light-shielding portions 143. In some embodiments, on a horizontal plane (the normal direction of which is, for example, parallel to the third axis A3), the size of the light-transmitting portion 144 may be larger than the size of the first optical opening 116 and/or the second optical opening 117. In some embodiments, the shape of the light-transmitting portion 144 may be different from the shape of the first optical opening 116 and/or the second optical opening 117. However, the present disclosure is not limited thereto. As a result, single optical element 140 can be used to simultaneously open or close the first optical opening 116 and the second optical opening 117, thereby reducing the manufacturing cost of the optical element driving mechanism 100. The detailed structure and operation of the movable portion 130 and the optical element 140 will be further described below with reference to FIG. 3, FIG. 4A and FIG. 4B.

In some embodiments, the optical element driving mechanism 100 includes a linkage assembly 150. The linkage assembly 150 includes a linkage element 151 and an opening structure 152. For example, the linking element 151 is located on the movable portion 130 and has a protruding structure protruding toward the optical element 140. The opening structure 152 is located in the optical element 140 and corresponds to the linkage element 151. In addition, the optical element driving mechanism 100 includes a driving assembly 160. The driving assembly 160 includes a magnetic element 161, a coil 162 and a magnetically permeable element 163. In this embodiment, the magnetic element 161 is disposed in the movable portion 130, and the coil 162 surrounds the magnetically permeable element 163 and is disposed in the base 120. However, the present disclosure is not limited thereto. In some other embodiments, the magnetic element 161 may be disposed in the base 120, while the coil 162 and the magnetically permeable element 163 are disposed in the movable portion 130. In some embodiments, the linkage element 151 may correspond to magnetic element 161. For example, the linking element 151 may be located above the magnetic element 161, and in a vertical direction (for example, parallel to the third axis A3), the linking element 151 can overlap the magnetic element 161.

Figure 3:
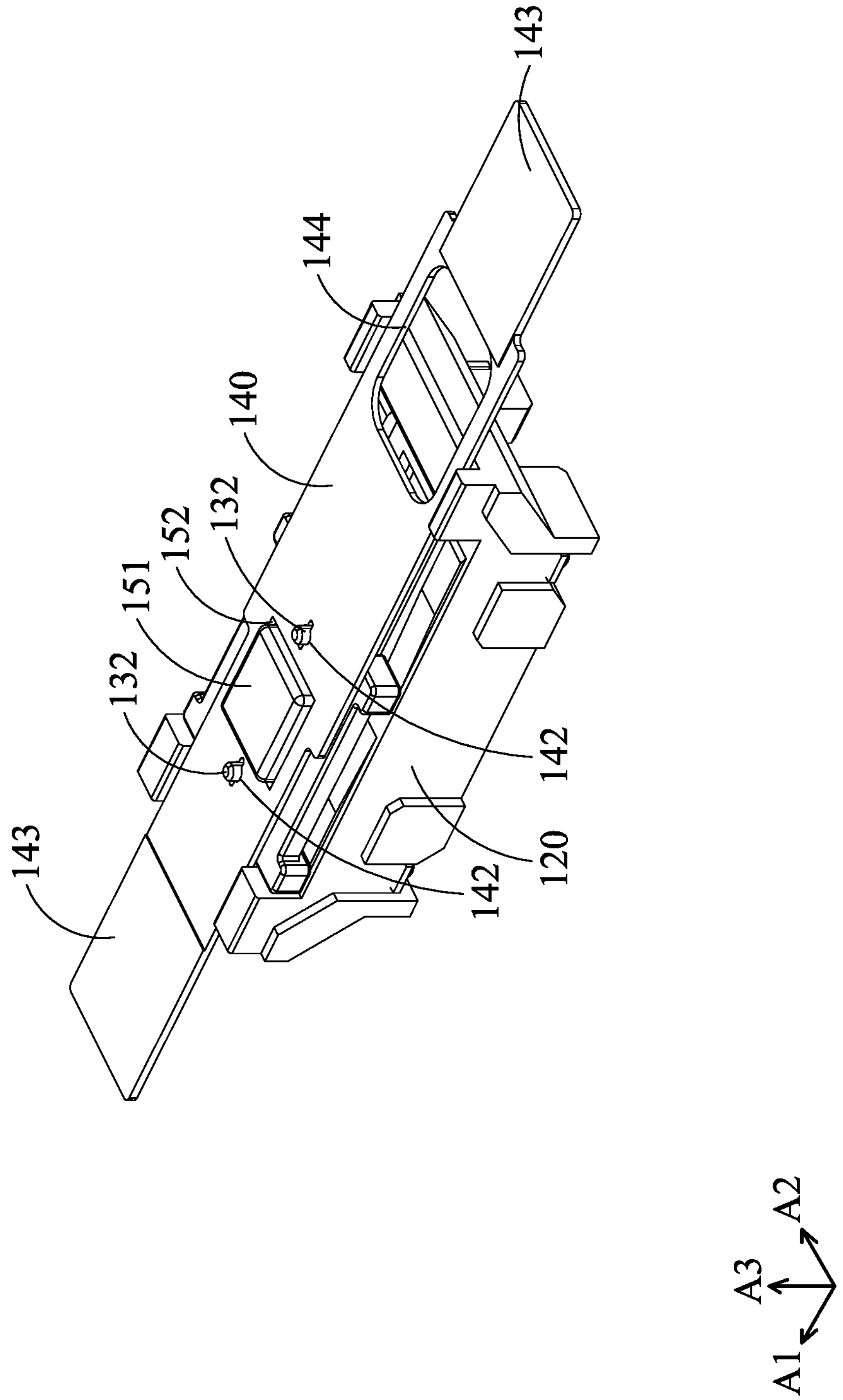
FIG. 3 shows a perspective view illustrating the interior structure of the optical element driving mechanism in accordance with some embodiment of the present disclosure.

FIG. 3 shows a perspective view illustrating the internal structure of the optical element driving mechanism 100 in accordance with some embodiments of the present disclosure. As shown in FIG. 3, the linkage element 151 is inserted into the opening structure 152 of the optical element 140. In addition, the movable portion 130 has positioning columns 132 that are located on opposite sides of the linkage element 151. The optical element 140 has positioning holes 142 that correspond to the positioning columns 132. Specifically, when the linkage element 151 passes through the opening structure 152 (at this time, the linkage element 151 and the opening structure 152 overlap on the second axis A2 and the third axis A3), the positioning columns 132 will pass through the corresponding positioning hole 142. As a result, the optical element 140 can be stably connected to the movable portion 130. In some embodiments, an adhesive (not shown) may be disposed between the movable portion 130 and the optical element 140 to bond the movable portion 130 and the optical element 140. However, the present disclosure is not limited thereto.

Figure 4A:
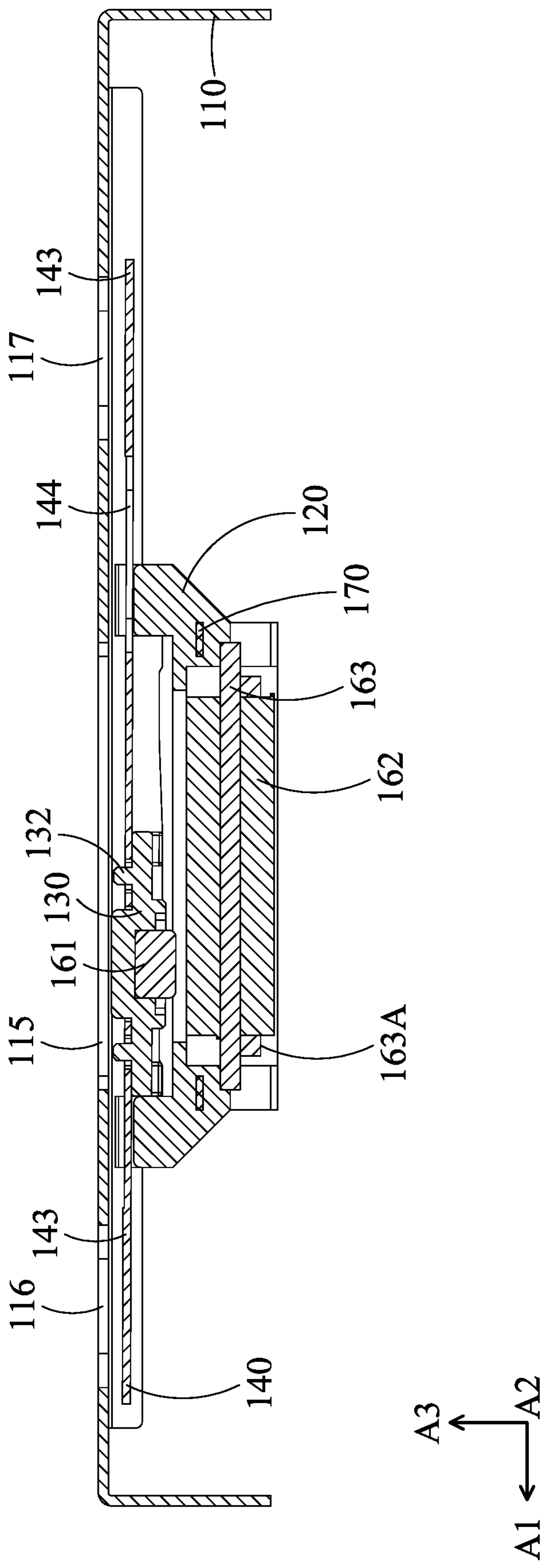
FIGS. 4A and 4B show cross-sectional views illustrating the optical element driving mechanism in accordance with some embodiment of the present disclosure.
Figure 4B:
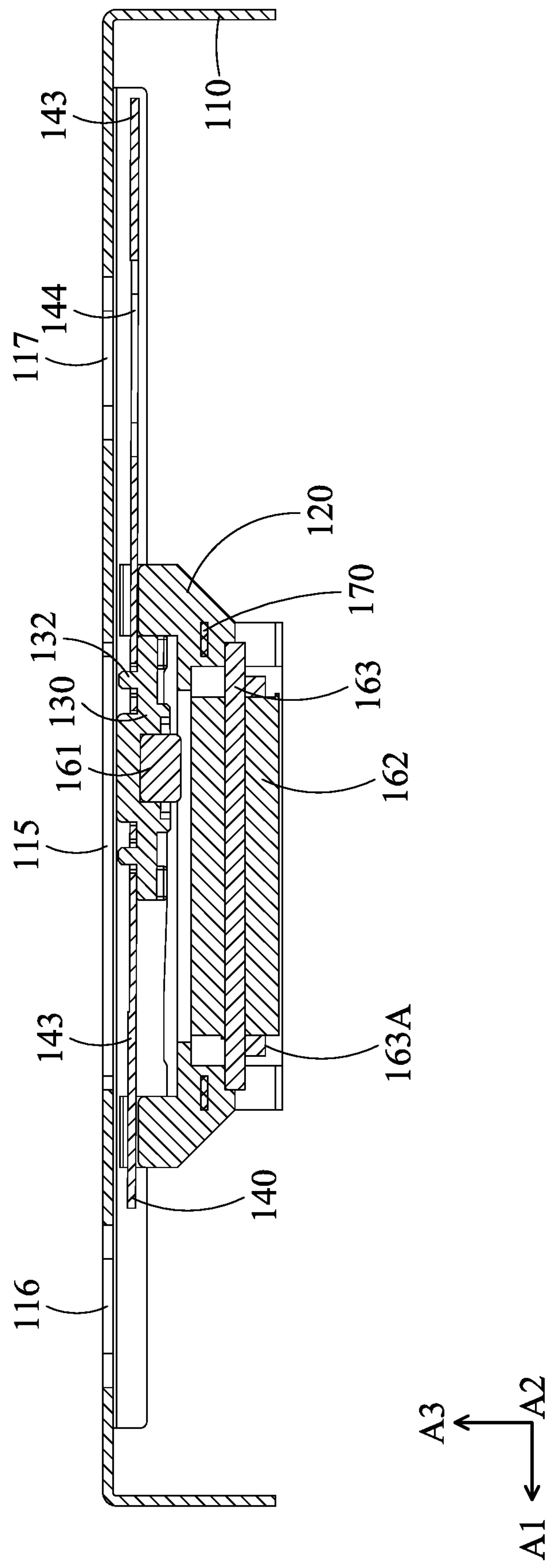

FIGS. 4A and 4B show cross-sectional views illustrating the optical element driving mechanism 100 in accordance with some embodiments of the present disclosure. For example, FIGS. 4A and 4B can be illustrated along line C-C shown in FIG. 1, but the present disclosure is not limited thereto. As shown in FIG. 4A, in some embodiments, the magnetically permeable element 163 has protruding portions 163A that protrude toward the bottom surface of the base 120 (for example, along the third axis A3). The coil 162 may surround magnetically permeable element 163 and contact the protruding portions 163A. In this way, it may be advantageous to arrange the coil 162 around the magnetically permeable element 163. In some embodiments, the position of the protruding portions 163A may correspond to the range of motion of the movable portion 130. Although this embodiment illustrates the protruding portions 163A protruding downward, the present disclosure is not limited thereto. In other embodiments, the protruding portions 163A may protrude upward (for example, toward the movable portion 130). In some embodiments, the magnetic element 161 disposed on the movable portion 130 can generate a magnetic attraction force with the magnetically permeable element 163, so that the movable portion 130 can rest on the base 120 and be kept at a desired position. As shown in FIG. 4A, the optical element 140 moves to the first position (for example, the light-shielding position) at this time, the light-shielding portions 143 of the optical element 140 will cover the first optical opening 116 and the second optical opening 117 so that light cannot pass through the first optical opening 116 and the second optical opening 117.

As shown in FIG. 4B, when it is required to move the optical element 140 to allow light to pass through the first optical opening 116 and the second optical opening 117, the electrical signal can be transmitted to the coil 162. At this time, the coil 162 and the magnetically permeable element 163 will generate a magnetic thrust corresponding to the magnetic element 161. As a result, the coil 162 and the magnetically permeable element 163 will generate a force substantially parallel to the first axis A1 to drive the movable portion 130 to move along the first axis A1. In this embodiment, the light-transmitting portion 144 of the optical element 140 is located below the second optical opening 117, and the first optical opening 116 and the optical element 140 are misaligned (that is, they do not overlap on the third axis A3). At this time, the optical element 140 moves to the second position (for example, the light-transmitting position), and light can pass through the first optical opening 116 and the second optical opening 117. In summary, the driving assembly 160 (including the magnetic element 161, the coil 162 and the magnetically permeable element 163) can be used to drive the movable portion 130 to move along the first axis A1 relative to the fixed portion F (such as the outer frame 110 and the base 120) so as to control the optical element 140 to block or reveal the first optical opening 116 and the second optical opening 117.

Figure 5:
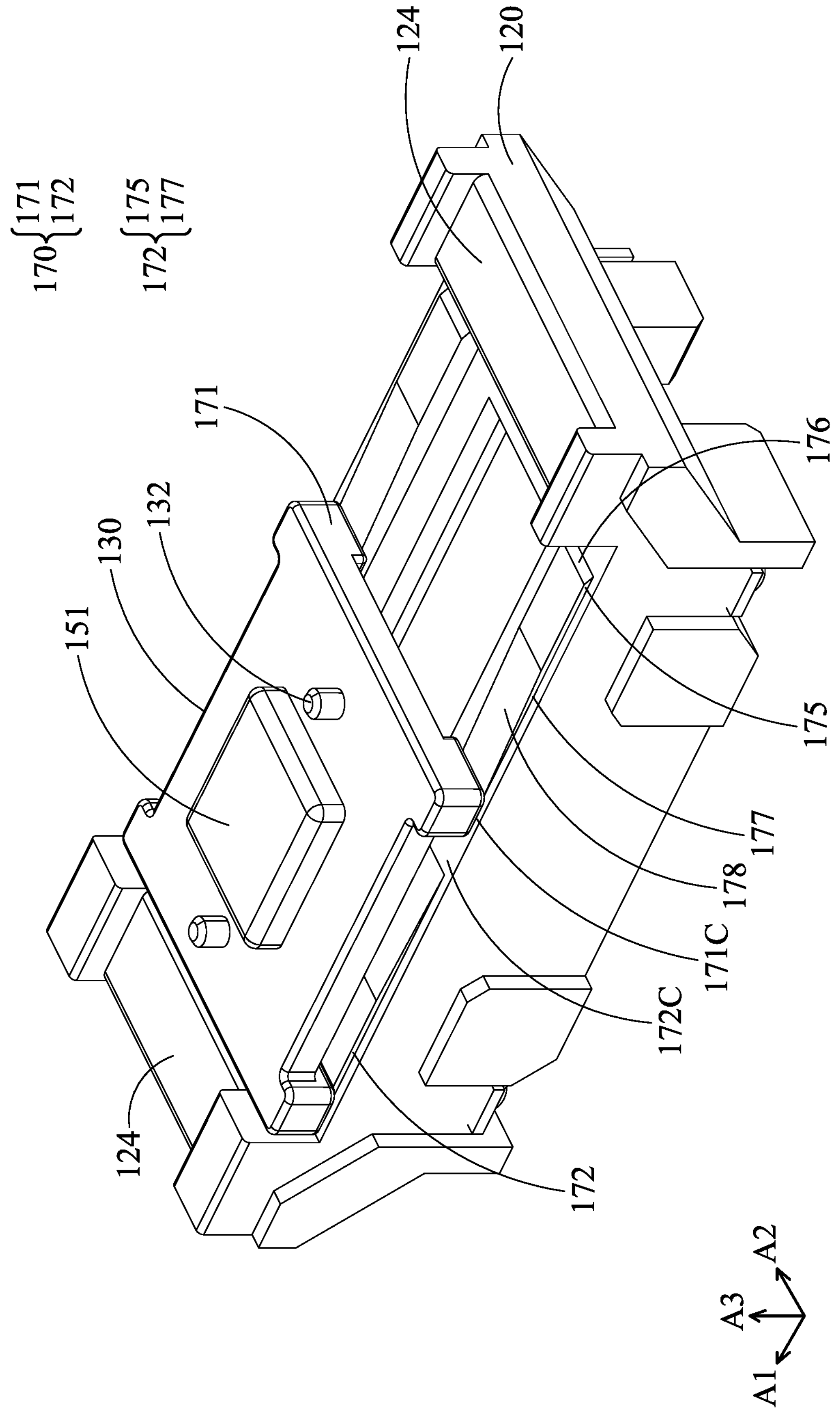
FIG. 5 shows a perspective view illustrating the movable portion and the base in accordance with some embodiment of the present disclosure.

FIG. 5 shows a perspective view illustrating the movable portion 130 and the base 120 in accordance with some embodiments of the present disclosure. In some embodiments, the base 120 may include a supporting structure 124 located on opposite sides of the base 120 for supporting the optical element 140. As a result, the supporting structure 124 can help to keep the optical element 140 horizontal in the first position (such as the light-shielding position) and the second position (such as the light-transmitting position). As shown in FIG. 5, the optical element driving mechanism 100 includes a guiding assembly 170, and the movable portion 130 is movable along the first axis A1 relative to the fixed portion F (such as the base 120) via the guiding assembly 170. For example, the guiding assembly 170 may include a first guiding assembly 171 and a second guiding assembly 172. In some embodiments, the first guiding assembly 171 may be disposed on the movable portion 130 and the second guiding assembly 172 may be disposed on the base 120, but the present disclosure is not limited thereto. In some embodiments, the second guiding assembly 172 contacts the first guiding assembly 171, and the first guiding assembly 171 is movable relative to the second guiding assembly 172. In some embodiments, a first contact surface 171C of the first guiding assembly 171 contacts a second contact surface 172C of the second guiding assembly 172. In the second axis A2, the maximum dimension (such as width) of the first contact surface 171C is different from the maximum dimension (such as width) of the second contact surface 172C. For example, in the second axis A2, the maximum size of the first contact surface 171C is larger than the maximum size of the second contact surface 172C. In this way, the risk of the second guiding assembly 172 interfering with the movement of the movable portion 130 (and the magnetic element 161) can be reduced. However, the present disclosure is not limited thereto. In some embodiments, a chamfer structure may be formed on the edges of the first guiding assembly 171 and the second guiding assembly 172 to reduce the risk of dust generated during the movement of the movable portion 130 relative to the fixed portion F.

In some embodiments, the second guiding assembly 172 further includes a first positioning portion 175 and a second positioning portion 177, and the first positioning portion 175 and the second positioning portion 177 may protrude from the second contact surface 172C. In some embodiments, the height of the first positioning portion 175 and the second positioning portion 177 protruding from the second contact surface 172C may be in a range from about 0.06 mm to about 0.10 mm, but the present disclosure is not limited thereto. The first positioning portion 175 has a first positioning surface 176 that faces the first guiding assembly 171 and is inclined relative to the second contact surface 172C. In some embodiments, the angle between the first positioning surface 176 and the second contact surface 172C may be in a range from about 15 degrees to about 60 degrees (for example, about 30 degrees, about 45 degrees, etc.), but the present disclosure is not limited thereto. When the movable portion 130 is located at the first position, the first guiding assembly 171 abuts against the first positioning portion 175. In this way, when the movable portion 130 and the optical element 140 are not driven, the first positioning portion 175 may help to keep the movable portion 130 and the optical element 140 staying at their original position, thereby reducing the risk of failure of the optical element driving mechanism 100 due to external impact.

In addition, the second positioning portion 177 has a second positioning surface 178. The second positioning surface 178 faces the first guiding assembly 171 and is inclined relative to the second contact surface 172C. In some embodiments, the second positioning surface 178 and the second contact surface 172C are not parallel and not perpendicular to each other. The second positioning surface 178 may be adjacent to the first positioning surface 176. Specifically, the second positioning surface 178 and the first positioning surface 176 may intersect at an edge. In some embodiments, the second positioning surface 178 is not parallel and not perpendicular to the first positioning surface 176. For example, the angle between the first positioning surface 176 and the second contact surface 172C is different from the angle between the second positioning surface 178 and the second contact surface 172C. However, the present disclosure is not limited thereto.

Figure 6A:
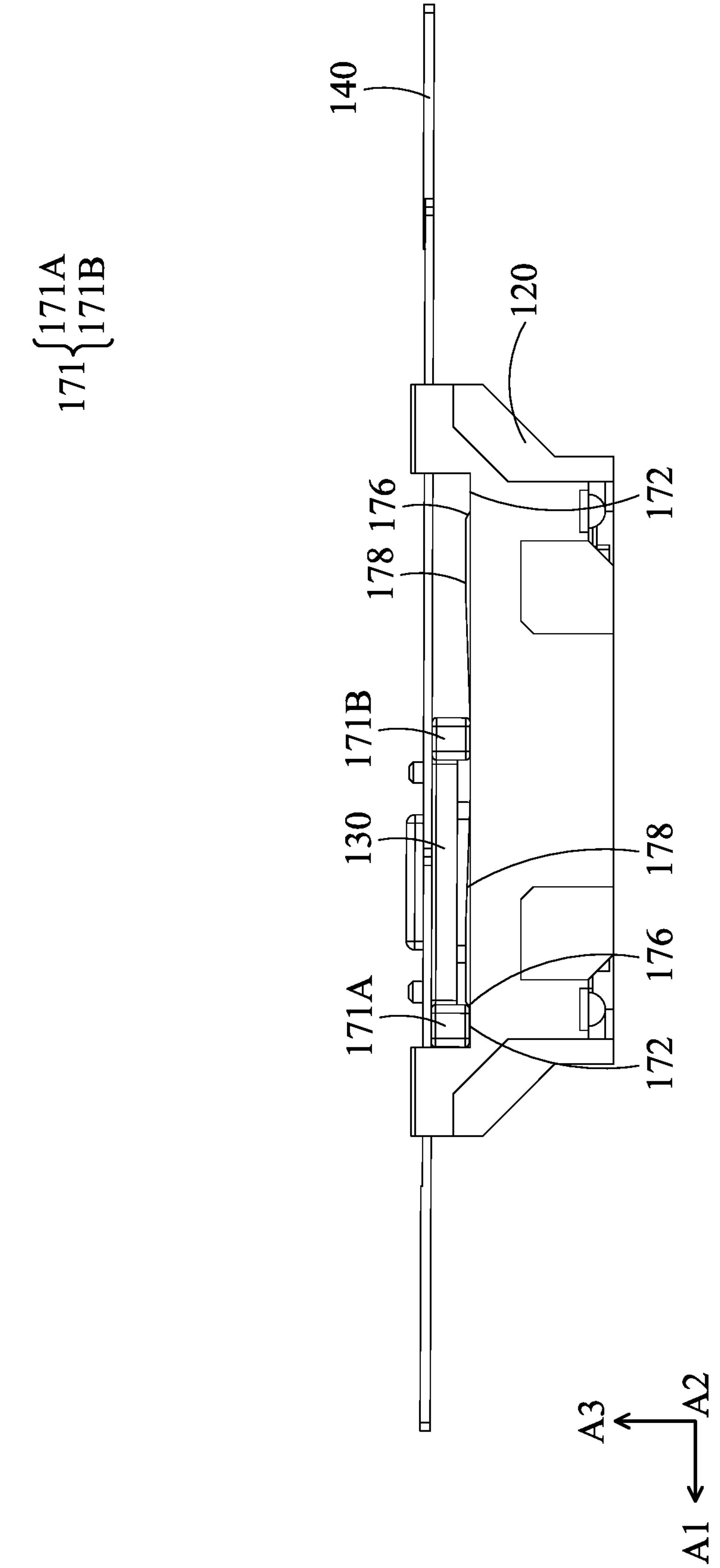
FIGS. 6A through 6C show side views illustrating the base and the movable portion in accordance with some embodiment of the present disclosure.
Figure 6B:
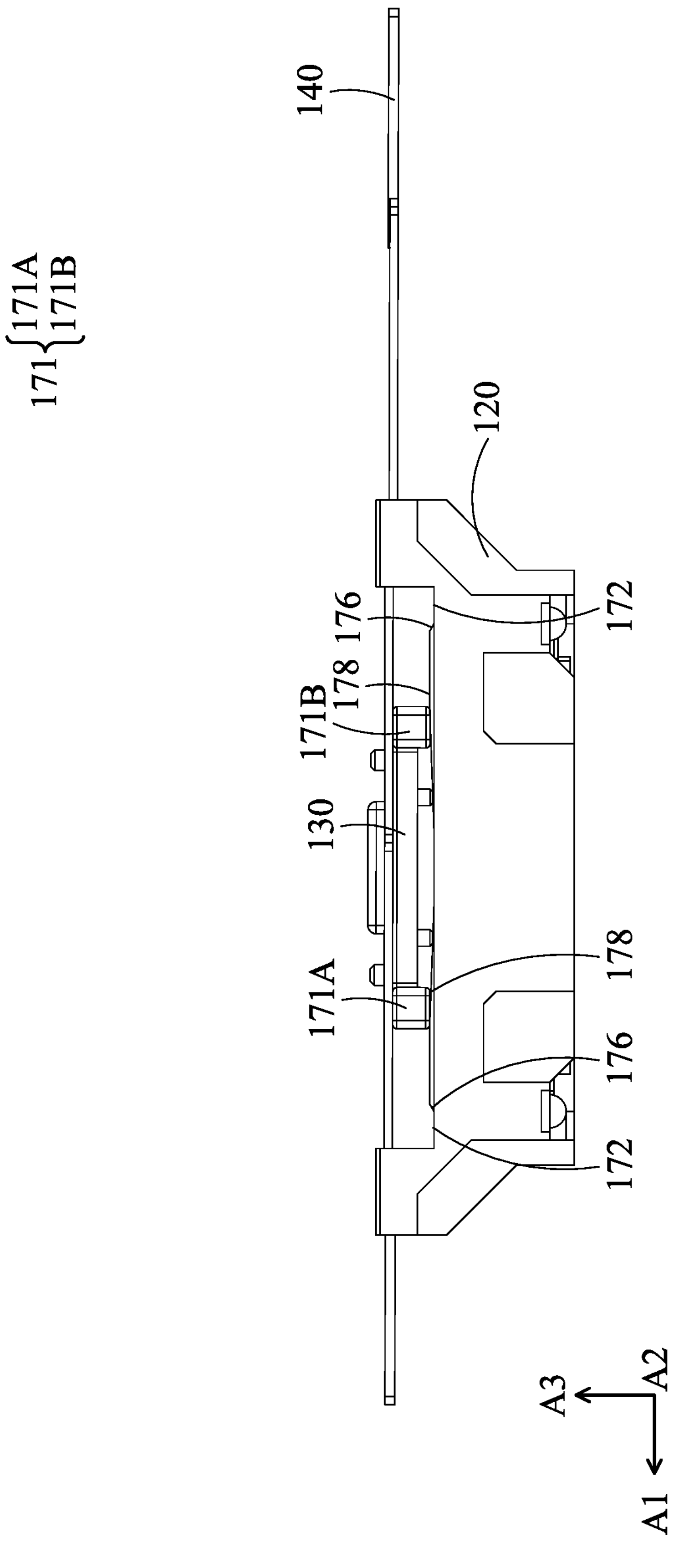
Figure 6C:
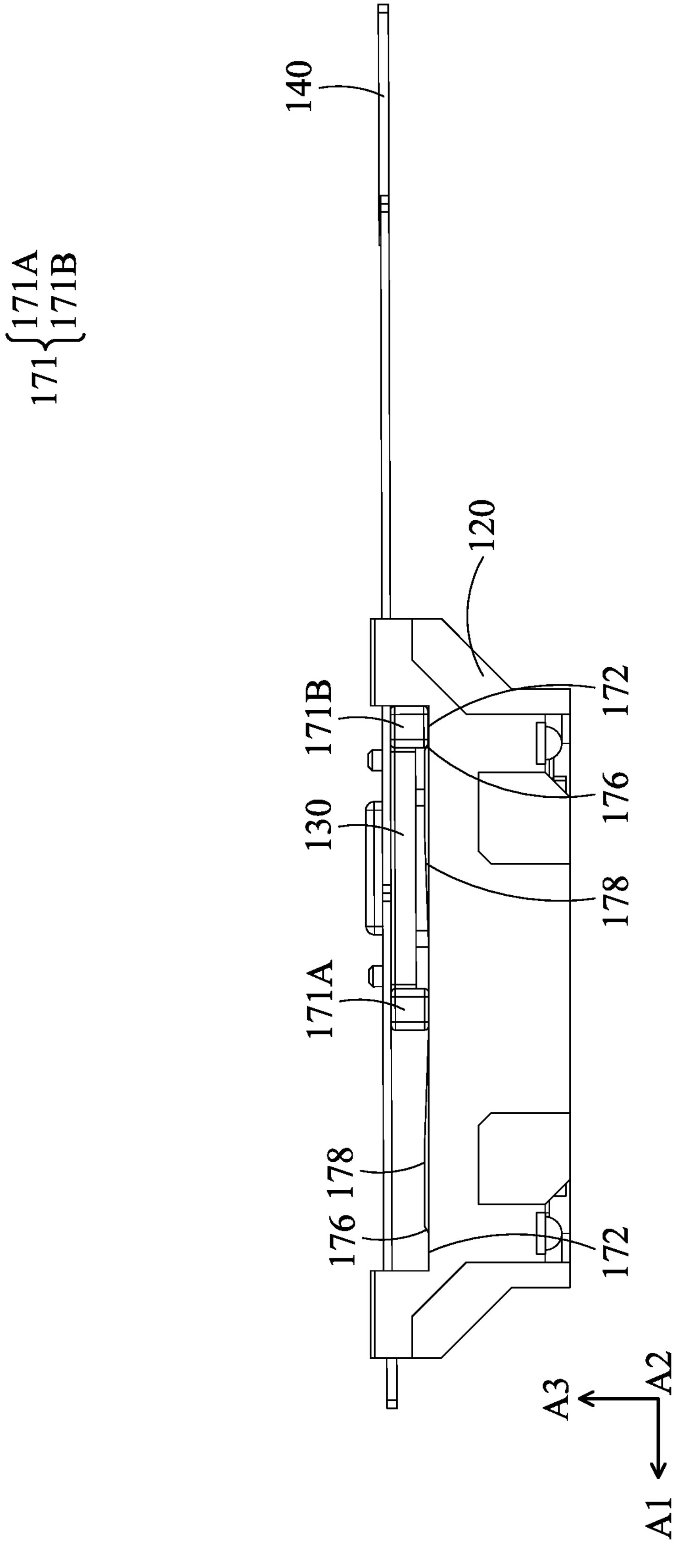

FIGS. 6A through 6C show side views illustrating the base 120 and the movable portion 130 in accordance with some embodiments of the present disclosure. As shown in FIG. 6A, when the movable portion 130 is located at the first position (for example, the light-shielding position), the guiding element 171A of the first guiding assembly 171 may abut against the first positioning surface 176 to maintain the position of the movable portion 130, reducing the risk of the optical element 140 being displaced and causing the optical element driving mechanism 100 to fail. At this time, the guiding element 171A and the guiding element 171B of the first guiding assembly 171 are both located on and in contact with the second contact surface 172C.

Next, as shown in FIG. 6B, when the driving assembly 160 starts to drive the movable portion 130 to move along the first axis A1, the guiding element 171A that originally abutted the first positioning surface 176 will first move along the first positioning surface 176 to the second positioning surface 178, while the guiding element 171B simultaneously moves along the opposite second positioning surface 178. At this time, the movable portion 130 may be located in the middle position. Since the second positioning surface 178 is inclined relative to the second contact surface 172C, it is advantageous for the movable portion 130 to move via the guiding elements 171A and 171B of the first guiding assembly 171, thereby reducing the resistance to movement of the movable portion 130.

As shown in FIG. 6C, when the movable portion 130 is located at the second position (for example, the light-transmitting position), the guiding element 171B of the first guiding assembly 171 can return to the second contact surface 172C via the second positioning surface 178 and the first positioning surface 176 and abut against the first positioning surface 176, so as to keep the position of the movable portion 130 and reduce the risk of the optical element 140 being displaced and causing the optical element driving mechanism 100 to fail. Similarly, the guiding element 171A and the guiding element 171B of the first guiding assembly 171 are both located on and in contact with the second contact surface 172C.

Figure 7:
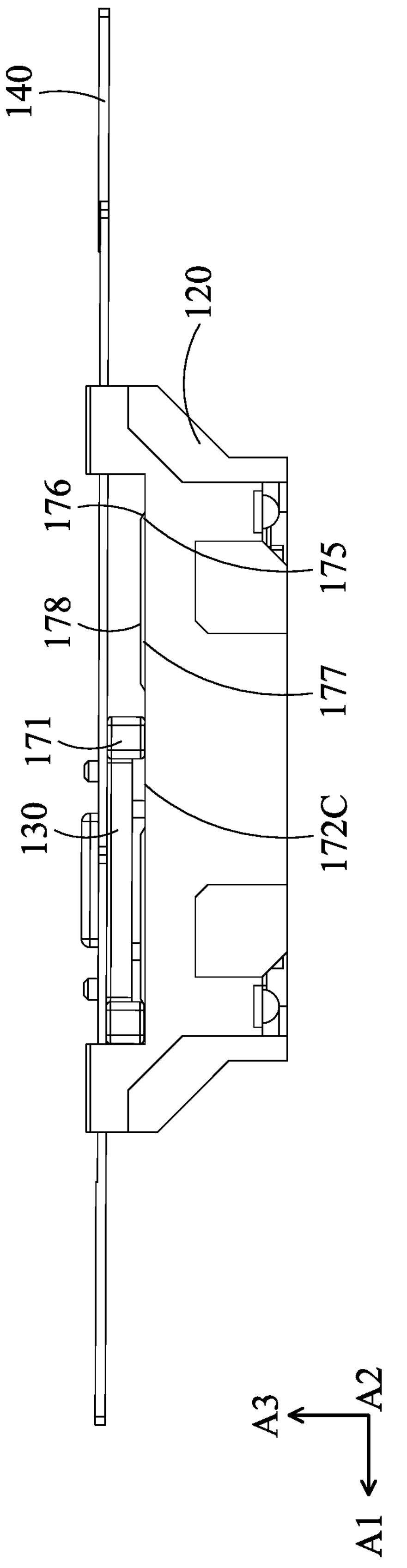
FIG. 7 shows a side view illustrating the base and the movable portion in accordance with some embodiment of the present disclosure.

FIG. 7 shows a side view illustrating the base 120 and the movable portion 130 in accordance with some embodiments of the present disclosure. It should be noted that the base 120 and the movable portion 130 shown in this embodiment may include the same or similar structures or portions as the base 120 and the movable portion 130 shown in FIGS. 6A through 6C. These same or similar structures or portions will be labeled by the same or similar numerals. As shown in FIG. 7, the second guiding assembly 172 includes a first positioning portion 175 and a second positioning portion 177, and the first positioning portion 175 and the second positioning portion 177 may protrude from the second contact surface 172C. The first positioning portion 175 has a first positioning surface 176 that faces the first guiding assembly 171 and is inclined relative to the second contact surface 172C. In some embodiments, the angle between the first positioning surface 176 and the second contact surface 172C may be in a range from about 15 degrees to about 60 degrees (such as about 30 degrees, about 45 degrees, etc.), but the present disclosure is not limited thereto.

When the movable portion 130 is located at the first position (for example, the light-shielding position), the first guiding assembly 171 abuts the first positioning portion 175. In this way, when the movable portion 130 and the optical element 140 are not driven, the first positioning portion 175 can help to keep the movable portion 130 and the optical element 140 in position, thereby reducing the risk of failure of the optical element driving mechanism 100 due to external impact. In this embodiment, the second positioning portion 177 has a second positioning surface 178. The second positioning surface 178 may be adjacent to the first positioning surface 176 and generally parallel to the second contact surface 172C. Specifically, the second positioning surface 178 and the first positioning surface 176 may intersect at an edge. In some embodiments, the second positioning surface 178 is not parallel and not perpendicular to the first positioning surface 176. However, the present disclosure is not limited thereto.

Figure 8:
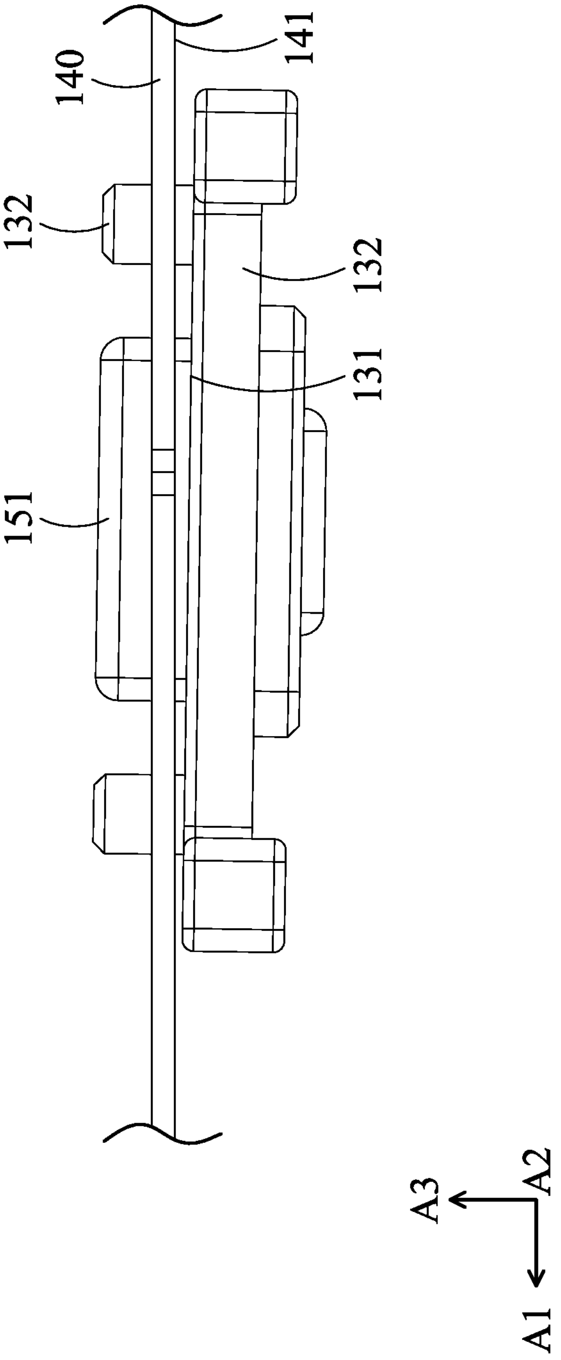
FIG. 8 shows a partial side view illustrating the movable portion and the optical element in accordance with some embodiment of the present disclosure.

FIG. 8 shows a partial side view illustrating the movable portion 130 and the optical element 140 in accordance with some embodiments of the present disclosure. As shown in FIG. 8, the movable portion 130 has a first corresponding surface 131 facing a second corresponding surface 141 of the optical element 140. For example, the first corresponding surface 131 may be the upper surface of the movable portion 130, and the second corresponding surface 141 may be the lower surface of the optical element 140, but the present disclosure is not limited thereto. In this embodiment, the optical element 140 is movable relative to the movable portion 130, that is, there is no adhesive between the optical element 140 and the movable portion 130. The linkage element 151 and the positioning columns 132 can pass through the optical element 140 in a direction parallel to the third axis A3, and the movement range of the optical element 140 does not exceed the linkage element 151 and the positioning columns 132. In other words, the optical element 140 will remain connected to the movable portion 130 via the linkage assembly 150, and the linkage element 151 and the positioning columns 132 will not be separated from the movable portion 130 (no matter under any circumstances). For example, the range of motion of the optical element 140 in the vertical direction (which is parallel to the third axis A3) may be from about 0.06 mm to about 0.10 mm.

In some embodiments, when the movable portion 130 is located at the middle position (for example, as shown in FIG. 6B), the first corresponding surface 131 does not contact the second corresponding surface 141, and the first corresponding surface 131 and the second corresponding surface 141 are not parallel to each other. In some embodiments, the gap between the optical element 140 and the movable portion 130 may be in a range from about 0.06 mm to about 0.10 mm (such about 0.08 mm). Specifically, in this embodiment, the optical element 140 can rest on the supporting structure 124 of the base 120 (as shown in FIG. 5), so the optical element 140 can remain substantially horizontal during the movement of the movable portion 130. Therefore, the optical element 140 is movable relative to the movable portion 130 and the gap between the optical element 140 and the movable portion 130 remains. In this way, when the movable portion 130 moves relative to the fixed portion F along the first axis A1, since the optical element 140 is movable relative to the movable portion 130, the impact or shift caused by the movable portion 130 to the optical element 140 can be mitigated, reducing the risk of the optical element 140 being damaged due to collision with other elements.

Figure 9A:
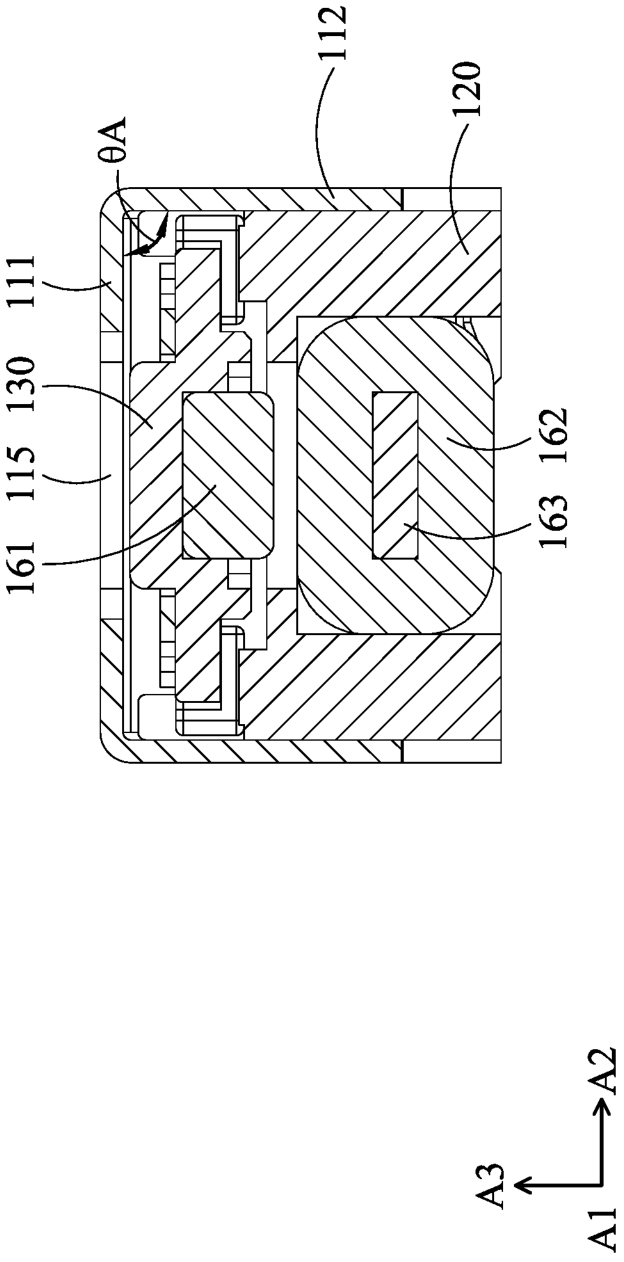
FIGS. 9A through 9C show cross-sectional views illustrating the optical element driving mechanism in accordance with some embodiment of the present disclosure.
Figure 9B:
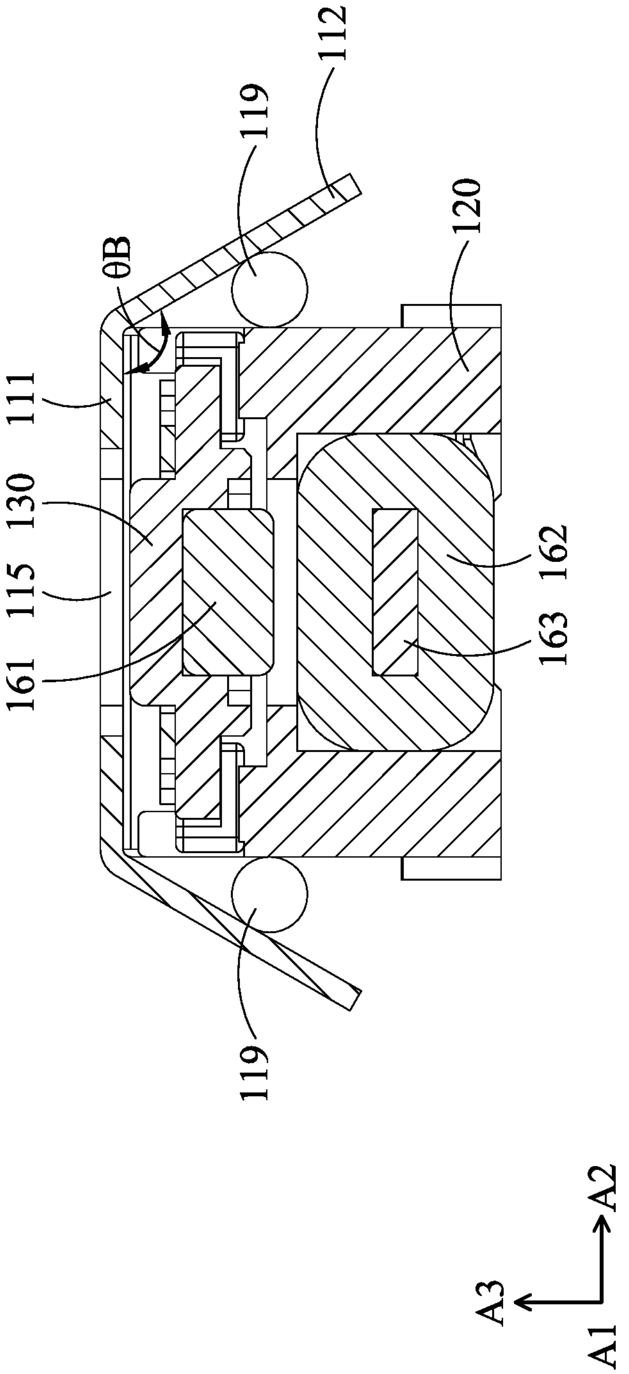
Figure 9C:
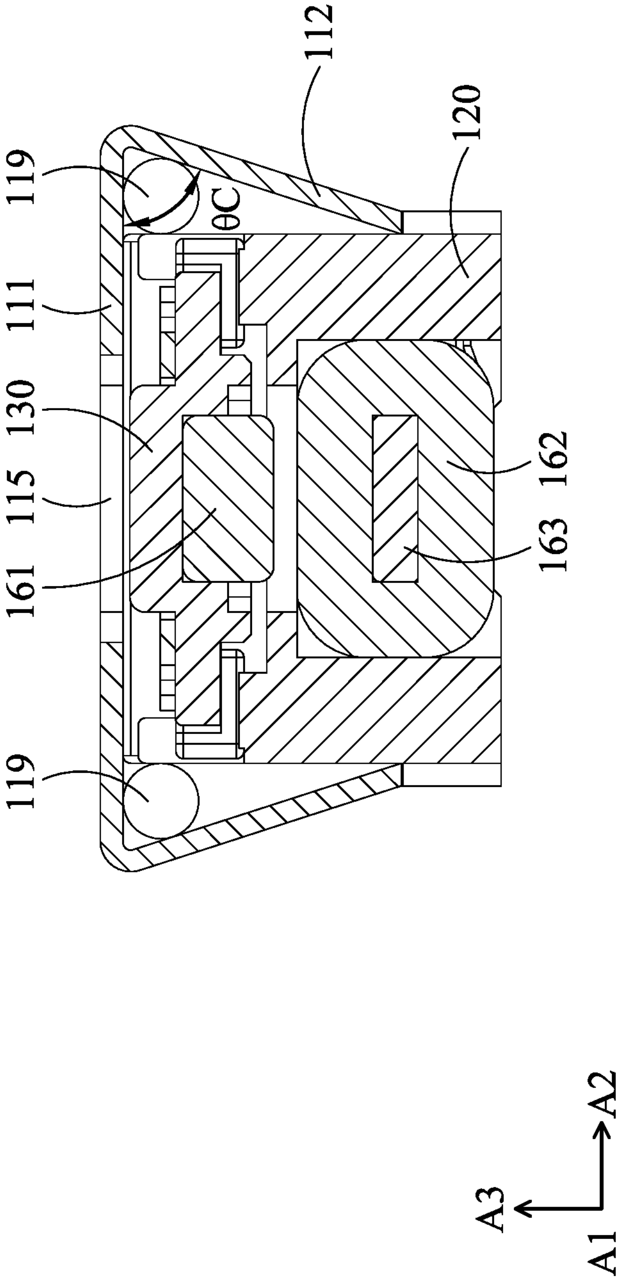

FIGS. 9A through 9C shows cross-sectional views illustrating the optical element driving mechanism 100 in accordance with some embodiments of the present disclosure. For example, FIGS. 9A through 9C can be drawn along the line D-D shown in FIG. 1, but the present disclosure is not limited thereto. As shown in FIG. 9A, in this embodiment, the top surface 111 of the outer frame 110 and the sidewalls 112 extending from the top surface 111 cover the movable portion 130 and the optical element 140 located inside the optical element driving mechanism 100. In this embodiment, the angle θA formed between the top surface 111 and the sidewalls 112 may be approximately 90 degrees. In other words, the top surface 111 may be substantially perpendicular to the sidewalls 112. In this way, the sidewalls 112 can be bonded to the base 120, thereby protecting the movable portion 130 and the optical element 140 inside the optical element driving mechanism 100.

As shown in FIG. 9B, in this embodiment, the angle θB formed between the top surface 111 and the sidewalls 112 may be greater than 90 degrees. In other words, an obtuse angle may be formed between the top surface 111 and the sidewalls 112. In some embodiments, an adhesive 119 may be disposed between the sidewalls 112 and the base 120 to bond the outer frame 110 and the base 120. However, the present disclosure is not limited thereto. Any material or structure that can bond the outer frame 110 and the base 120 is included within the scope of the present disclosure. With the above features, the difficulty of assembling the outer frame 110 and the base 120 can be reduced, thereby improving the manufacturing yield of the optical element driving mechanism 100.

As shown in FIG. 9C, in this embodiment, the top surface 111 can extend beyond the projected area of the base 120 on the horizontal plane (for example, perpendicular to the third axis A3), and the angle θC formed between the top surface 111 and the sidewalls 112 may be less than 90 degrees. In other words, an acute angle may be formed between the top surface 111 and the sidewalls 112. In some embodiments, the adhesive 119 may be disposed between the sidewalls 112 and the base 120 to bond the outer frame 110 and the base 120. However, the present disclosure is not limited thereto. In some embodiments, the adhesive 119 may be omitted. In addition, any material or structure that can bond the outer frame 110 and the base 120 is included within the scope of the present disclosure. With the above features, the joint strength of the outer frame 110 and the base 120 can be improved, thereby improving the structural strength of the optical element driving mechanism 100.

Figure 10:
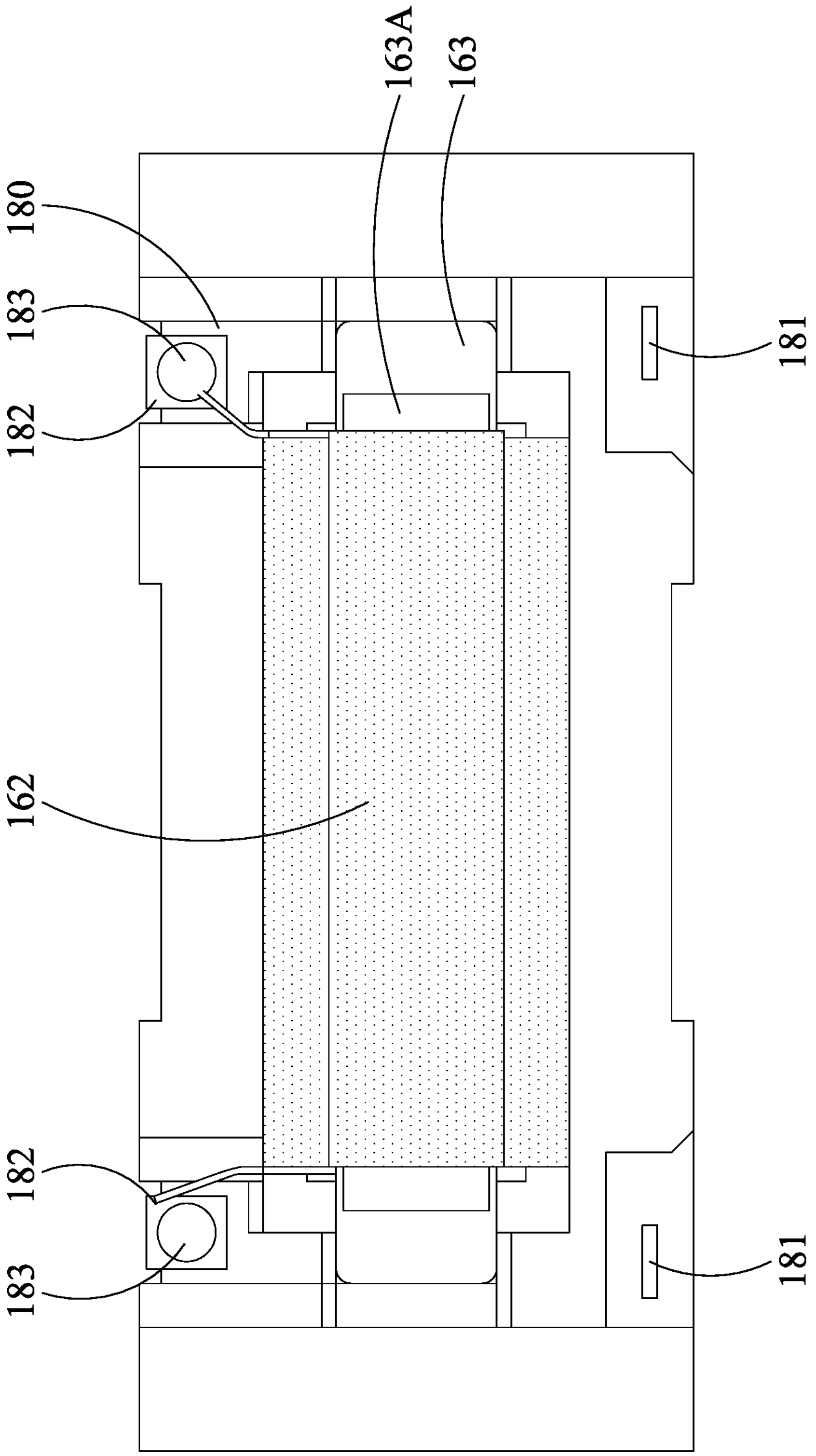
FIG. 10 shows a perspective view illustrating the base in accordance with some embodiment of the present disclosure.
Figure 11:
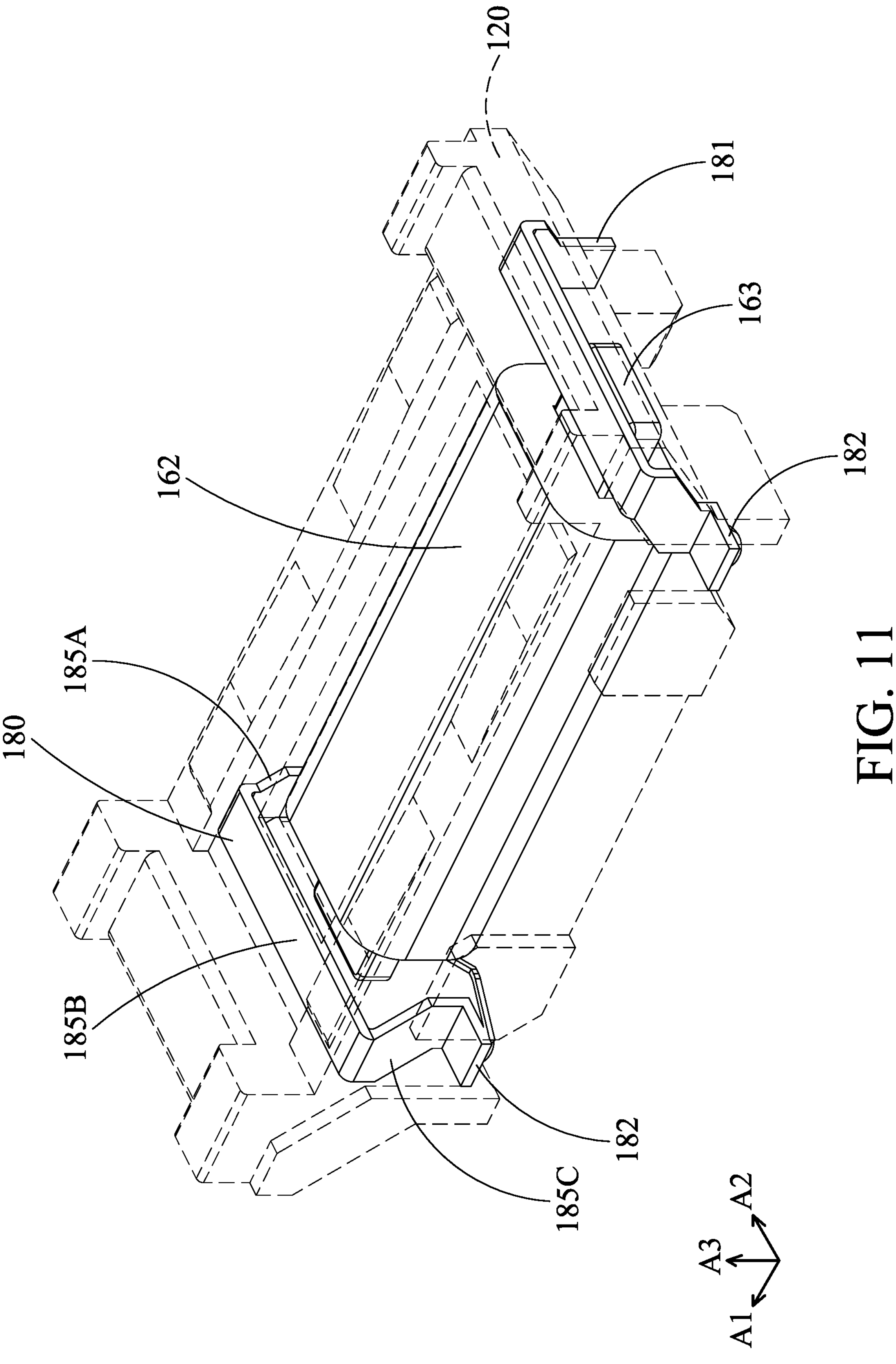
FIG. 11 shows a perspective view illustrating the base in accordance with some embodiment of the present disclosure.

FIG. 10 shows a bottom view illustrating the base 120 in accordance with some embodiments of the present disclosure. FIG. 11 shows a perspective view illustrating the base 120 in accordance with some embodiments of the present disclosure. In some embodiments, the coil 162 and the magnetically permeable element 163 can be installed below the base 120, that is, the coil 162 and the magnetically permeable element 163 are at least partially exposed from the bottom surface of the base 120. As shown in FIGS. 10 and 11, the optical element driving mechanism 100 includes a circuit assembly 180 to electrically connect the coil 162 to an external power source (not shown). In some embodiments, the circuit assembly 180 includes first contacts 181 and second contacts 182 located on opposite sides of the coil 162. For example, solder 183 may be applied on the second contacts 182 to electrically connect the coil 162 to the second contacts 182. However, the present disclosure is not limited thereto.

In addition, the circuit assembly 180 may include a plurality of segments 185A, 185B, and 185C, which are embedded in the base 120 and used to connect the first contacts 181 and the second contacts 182. Specifically, the aforementioned segments 185A, 185B and 185C can be connected to each other so that electrical signals can be transmitted between the first contacts 181 and the second contacts 182. In some embodiments, the segments 185A, 185B, and 185C of the circuit assembly 180 may surround the magnetically permeable element 163 and extend in different directions. In some embodiments, the circuit assembly 180 (such as the segments 185A, 185B, and 185C) at least partially overlaps magnetically permeable element 163 in two axes (which are parallel to the second axis A2 and the third axis A3, respectively). By using the segments 185A, 185B, and 185C embedded in the base 120, the structural strength of the optical element driving mechanism 100 can be improved, and the size of the overall structure can be reduced to achieve miniaturization. It should be understood that the configurations of the segments 185A, 185B and 185C shown in the present disclosure are only examples and are not intended to limit the scope of the present disclosure.

Figure 12:
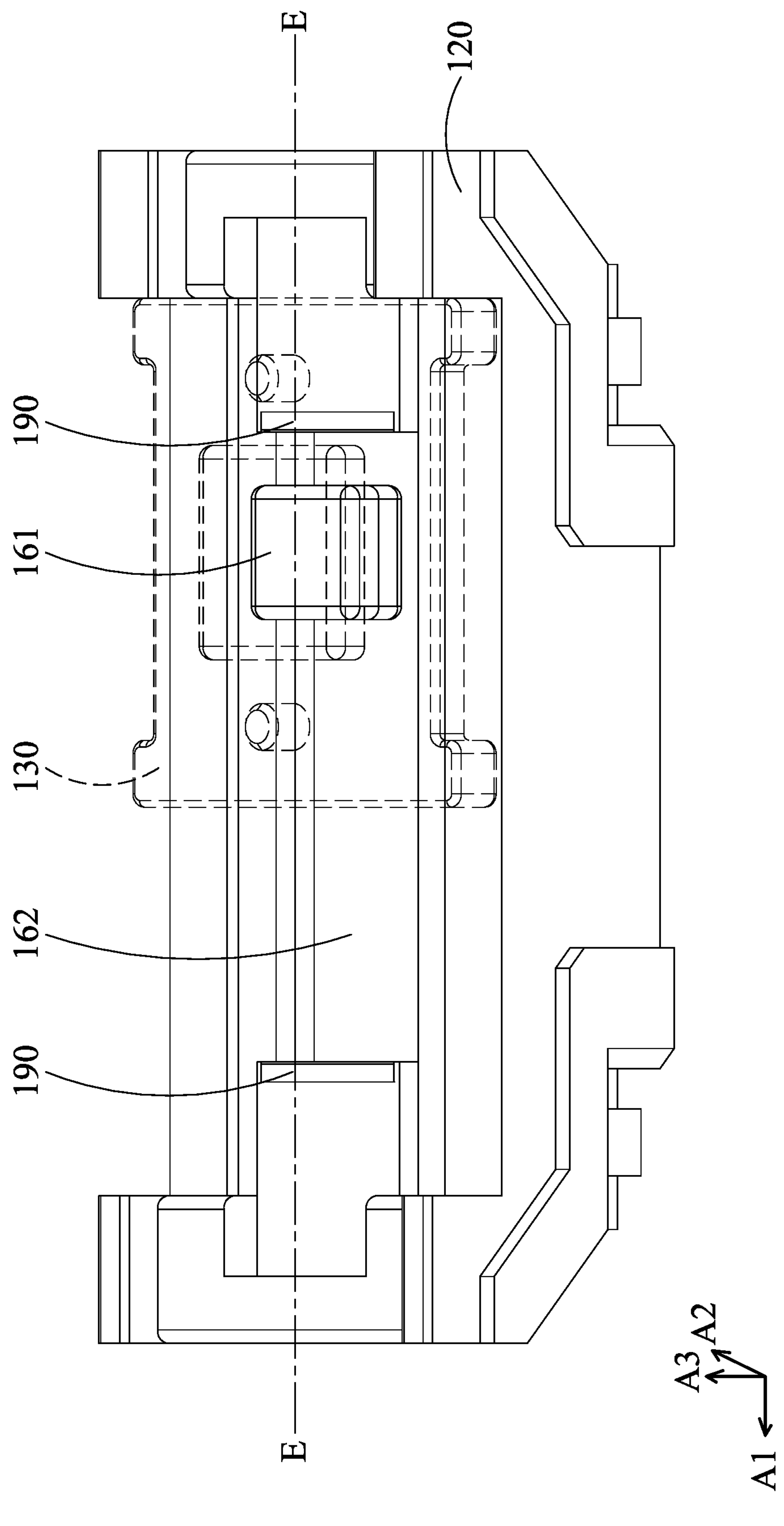
FIG. 12 shows a perspective view illustrating the movable portion and the base in accordance with some embodiment of the present disclosure.
Figure 13:
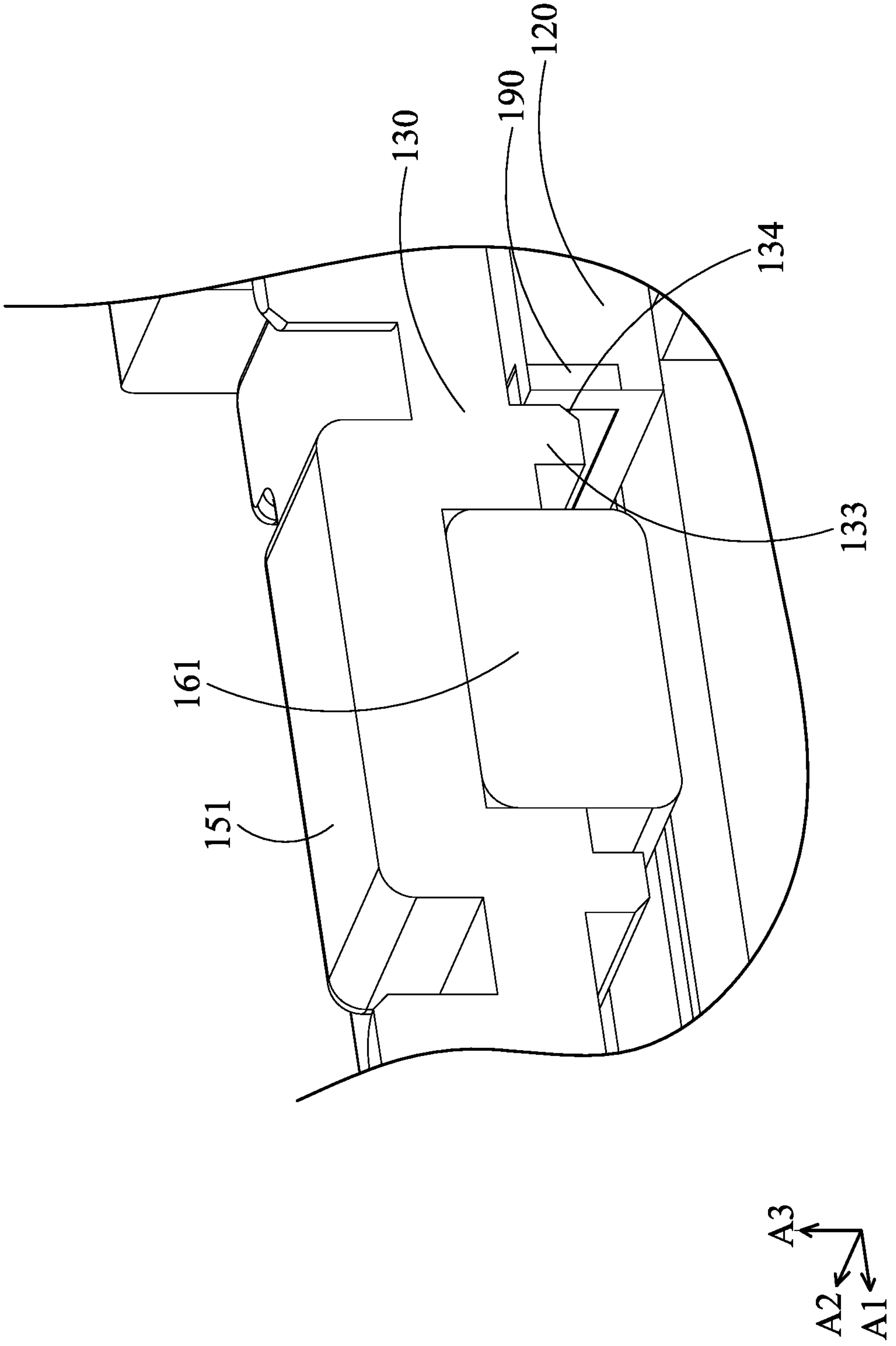
FIG. 13 shows a cross-sectional view illustrating the movable portion and the base in accordance with some embodiment of the present disclosure.

FIG. 12 shows a perspective view illustrating the movable portion 130 and the base 120 in accordance with some embodiments of the present disclosure. FIG. 13 shows a cross-sectional view illustrating the movable portion 130 and the base 120 in accordance with some embodiments of the present disclosure. For example, FIG. 13 may be drawn along the line E-E shown in FIG. 12, but the present disclosure is not limited thereto. As shown in FIG. 12, a magnetically permeable sheet 190 is embedded on opposite sides of the base 120. In other words, the magnetically permeable sheets 190 are not exposed from the surfaces of the base 120. However, the present disclosure is not limited thereto. In this way, when the movable portion 130 is located at the first position (for example, the light-shielding position) or the second position (for example, the light-transmitting position), the magnetically permeable sheets 190 can generate a magnetic attraction force with the magnetic element 161 in the movable portion 130. Such configuration can reduce the risk of the movable portion 130 and the optical element 140 being displaced when they are not driven, thereby reducing the probability of failure of the optical element driving mechanism 100.

As shown in FIG. 13, the movable portion 130 includes a bearing portion 133 for abutting the base 120 when the movable portion 130 moves to the extreme position (such as the first position or the second position discussed above). In some embodiments, the bearing portion 133 includes a chamfer structure 134 corresponding to the base 120. When the movable portion 130 moves to the extreme position, the chamfer structure 134 will face the base 120. In this way, dust or foreign matter generated during the collision between the movable portion 130 and the base 120 can be reduced. It should be understood that since the magnetically permeable sheets 190 are embedded in the base 120, when the movable portion 130 moves to the above-mentioned extreme position, the magnetically permeable sheets 190 will not contact the movable portion 130, thereby reducing the risk of damage to the magnetically permeable sheets 190. With the arrangement of the magnetically permeable sheets 190, the structural strength of the base 120 can be increased and the service life of the optical element driving mechanism 100 can be extended.

As set forth above, the present disclosure provides an optical element driving mechanism including a guiding assembly to move the movable portion relative to the fixed portion. With the arrangement of the guide assembly, the risk of displacement of the movable portion and the optical element while they are not driven can be reduced, thereby reducing the risk of failure of the optical element driving mechanism. In addition, a chamfer structure can be formed on the edge of the guiding assembly and the movable portion to reduce the risk of dust generated by the movement of the movable portion relative to the fixed portion. In addition, the optical element is movable relative to the movable portion, thereby reducing the impact or shift of the movable portion on the optical element, thereby reducing the risk of the optical element being damaged due to collision with other elements.

While the embodiments and the advantages of the present disclosure have been described above, it should be understood that those skilled in the art may make various changes, substitutions, and alterations to the present disclosure without departing from the spirit and scope of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. As long as those may perform substantially the same function in the aforementioned embodiments and obtain substantially the same result, they may be used in accordance with some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. An optical element driving mechanism, comprising:
- a movable portion used to connect an optical element;
- a fixed portion, wherein the movable portion movable relative to the fixed portion;
- a driving assembly used to drive the movable portion to move relative to the fixed portion in a first axis; and
- a guiding assembly, wherein the movable portion is movable in the first axis relative to the fixed portion via the guiding assembly, and the guiding assembly comprises:
- a first guiding assembly; and
- a second guiding assembly in contact with and movable relative to the first guiding assembly, wherein a first contact surface of the first guiding assembly contacts a second contact surface of the second guiding assembly,
- wherein in a second axis, a width of the first contact surface is greater than a width of the second contact surface, and the second axis is perpendicular to the first axis, and in the first axis, a length of the second contact surface is greater than a length of the first contact surface.

2. The optical element driving mechanism as claimed in claim 1, wherein the second guiding assembly further comprises:
- a first positioning portion having a first positioning surface, wherein the first positioning surface faces the first guiding assembly, and an angle formed between the first positioning surface and the second contact surface is between 15 degrees and 60 degrees.

3. The optical element driving mechanism as claimed in claim 2, wherein when the movable portion is located at a first position, the first guiding assembly abuts the first positioning portion, and the optical element blocks a plurality of optical openings of the fixed portion.

4. The optical element driving mechanism as claimed in claim 2, wherein the second guiding assembly further comprises a second positioning portion having a second positioning surface, wherein the second positioning surface faces the first guiding assembly, the second positioning surface is not parallel and not perpendicular to the first positioning surface.

5. The optical element driving mechanism as claimed in claim 4, wherein the second positioning surface is not parallel and not perpendicular to the second contact surface.

6. The optical element driving mechanism as claimed in claim 4, wherein the angle between the first positioning surface and the second contact surface is different from an angle between the second positioning surface and the second contact surface, and the angle between the first positioning surface and the second contact surface is greater than the angle between the second positioning surface and the second contact surface.

7. The optical element driving mechanism as claimed in claim 1, further comprising a linkage assembly, wherein when the movable portion moves relative to the fixed portion, the optical element is driven to move via the linkage assembly, and the optical element is movable relative to the movable portion.

8. The optical element driving mechanism as claimed in claim 7, wherein the linkage assembly includes:
- a linkage element having a protruding structure; and
- an opening structure corresponding to the linkage element.

9. The optical element driving mechanism as claimed in claim 8, wherein the linkage element and the opening structure overlap in a second axis and a third axis that are each perpendicular to the first axis and are perpendicular to each other.

10. The optical element driving mechanism as claimed in claim 1, wherein a first corresponding surface of the movable portion faces a second corresponding surface of the optical element, and when the movable portion is located at an intermediate position, the first corresponding surface does not contact the second corresponding surface.

11. The optical element driving mechanism as claimed in claim 10, wherein when the movable portion is located at the intermediate position, the first corresponding surface is not parallel to the second corresponding surface.

12. The optical element driving mechanism as claimed in claim 1, further comprising a magnetically permeable sheet embedded in the fixed portion, wherein when the movable portion is located at an extreme position, the magnetically permeable sheet is spaced apart from the movable portion.

13. The optical element driving mechanism as claimed in claim 12, wherein when the movable portion is located at the extreme position, a bearing portion of the movable portion contacts the fixed portion.

14. The optical element driving mechanism as claimed in claim 13, wherein the bearing portion comprises a chamfer structure, and when the movable portion is located at the extreme position, the chamfer structure contacts the fixed portion.

15. The optical element driving mechanism as claimed in claim 1, further comprises a circuit assembly electrically connected to the driving assembly, wherein the circuit assembly comprises a first contact and a second contact, and the first contact and the second contact are respectively located on opposite sides of a coil of the driving assembly.

16. The optical element driving mechanism as claimed in claim 15, wherein the circuit assembly includes a plurality of segments embedded in the fixed portion, and the segments extend in different directions.

17. The optical element driving mechanism as claimed in claim 1, wherein the fixed portion comprises an outer frame, the outer frame has a top surface and a sidewall extending from the top surface, and the sidewall is not parallel to the top surface.

18. The optical element driving mechanism as claimed in claim 17, wherein an angle between the sidewall and the top surface is less than 90 degrees.

* * * * *